US012613780B1

(12) United States Patent
Ma et al.

(10) Patent No.: US 12,613,780 B1
(45) Date of Patent: Apr. 28, 2026

(54) DATA EQUIVALENCY SYSTEM USING CO-PAIR MANIFESTS FOR IDENTIFYING DUPLICATES IN GENERATIONS OF RESOURCES

(71) Applicant: Amazon Technologies, Inc., Seattle, WA (US)

(72) Inventors: Edwin Ma, Seattle, WA (US); Sandeep Kumar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/759,493

(22) Filed: Jun. 28, 2024

(51) Int. Cl.
 *G06F 16/215* (2019.01)
 *G06F 11/1446* (2026.01)
 *G06F 21/60* (2013.01)

(52) U.S. Cl.
 CPC ...... *G06F 11/1453* (2013.01); *G06F 11/1451* (2013.01); *G06F 16/215* (2019.01); *G06F 21/602* (2013.01); *G06F 2201/80* (2013.01)

(58) Field of Classification Search
 CPC ............. G06F 11/1453; G06F 11/1451; G06F 16/215; G06F 21/602; G06F 2201/80; G06F 16/27; G06F 16/273; G06F 16/275; G06F 16/278; G06F 16/2365

USPC ................................................... 707/646, 634
 See application file for complete search history.

(56) References Cited

U.S. PATENT DOCUMENTS

| | | | | | |
|---|---|---|---|---|---|
| 11,016,671 B2 * | 5/2021 | Kumar | ................. | G06F 3/0617 |
| 11,556,659 B1 * | 1/2023 | Kumar | ................. | G06F 21/602 |
| 11,940,881 B1 * | 3/2024 | Srivastava | .......... | G06F 11/1453 |
| 2020/0322138 A1 * | 10/2020 | Kumar | ................. | H04L 63/062 |

* cited by examiner

*Primary Examiner* — Michael Pham
(74) *Attorney, Agent, or Firm* — Knobbe, Martens, Olson & Bear, LLP

(57) ABSTRACT

Systems and methods are provided for generating a listing of equivalent snapshot objects referenced by a set of object-based snapshots representing data of a corresponding block-storage volume at a point-in-time. Generating the listing comprises: retrieving a set of main manifests corresponding to the set of object-based snapshots, retrieving a set of co-pair manifests corresponding to the set of object-based snapshots, each co-pair manifest corresponding to an object-based snapshot and including a listing of encrypted snapshot objects with equivalencies to unencrypted snapshot objects, identifying data duplication in the set of main manifests based on listings of encrypted snapshot objects with equivalencies to unencrypted snapshot objects found in the set of co-pair manifests, and removing identified data duplication in the set of main manifests.

20 Claims, 11 Drawing Sheets

100

CLOUD PROVIDER NETWORK 120

VOLUMES 106

BUCKETS 111

BLOCK STORE SERVERS 105

INSTANCES 116

OBJECT STORAGE SERVERS 110

COMPUTE SERVERS 115

NETWORK 104

USER COMPUTING DEVICES 102

301

VOLUME "V" 320

Block 1
Block 2
Block 3
Block 4
Block 5

SNAPSHOT "S" MAIN MANIFEST 340

S_UNENCRYPTED_OBJECT_1
S_UNENCRYPTED_OBJECT_2
S_UNENCRYPTED_OBJECT_3
S_UNENCRYPTED_OBJECT_4
S_UNENCRYPTED_OBJECT_5

VOLUME "V1" 321

Block 1
Block 2
Block 3
Block 4
Block 5

SNAPSHOT "S1" MAIN MANIFEST 341

S1_ENCRYPTED_OBJECT_1
S1_ENCRYPTED_OBJECT_2
S1_ENCRYPTED_OBJECT_3
S1_ENCRYPTED_OBJECT_4
S1_ENCRYPTED_OBJECT_5

SNAPSHOT "S2" DIFFERENTIAL MANIFEST 342

S2_ENCRYPTED_OBJECT_3
S2_ENCRYPTED_OBJECT_4

SNAPSHOT "S1" CO-PAIR MANIFEST 345

S_UNENCRYPTED_OBJECT_1 = S1_ENCRYPTED_OBJECT_1
S_UNENCRYPTED_OBJECT_2 = S1_ENCRYPTED_OBJECT_2
S_UNENCRYPTED_OBJECT_3 = S1_ENCRYPTED_OBJECT_3
S_UNENCRYPTED_OBJECT_4 = S1_ENCRYPTED_OBJECT_4
S_UNENCRYPTED_OBJECT_5 = S1_ENCRYPTED_OBJECT_5

*FIG. 3B*

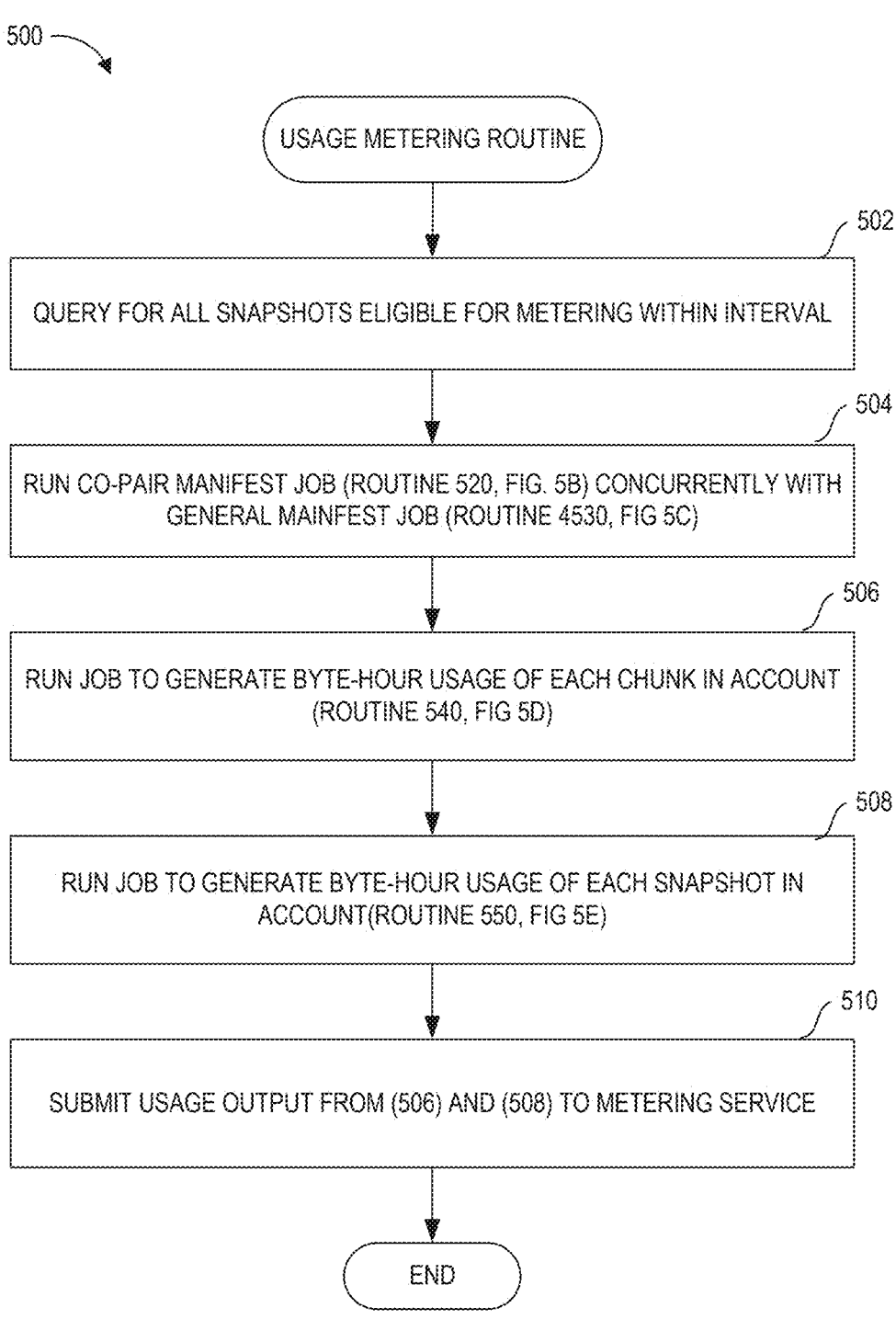

500

USAGE METERING ROUTINE

502

QUERY FOR ALL SNAPSHOTS ELIGIBLE FOR METERING WITHIN INTERVAL

504

RUN CO-PAIR MANIFEST JOB (ROUTINE 520, FIG. 5B) CONCURRENTLY WITH GENERAL MAINFEST JOB (ROUTINE 4530, FIG 5C)

506

RUN JOB TO GENERATE BYTE-HOUR USAGE OF EACH CHUNK IN ACCOUNT (ROUTINE 540, FIG 5D)

508

RUN JOB TO GENERATE BYTE-HOUR USAGE OF EACH SNAPSHOT IN ACCOUNT(ROUTINE 550, FIG 5E)

510

SUBMIT USAGE OUTPUT FROM (506) AND (508) TO METERING SERVICE

END

CO-PAIR MANIFEST JOB ROUTINE

522

FETCH LIST OF CO-PAIR MANIFEST REFERENCES FOR ALL SNAPSHOTS ELIGIBLE FOR METERING

524

REMOVE DUPLICATES FROM LIST OF CO-PAIR MANIFEST REFERENCES

526

OPEN CO-PAIR MANIFESTS TO LIST THE CO-PAIRINGS BETWEEN ENCRYPTED AND UNENCRYPTED CHUNKS

END

540

ROUTINE FOR
JOB TO GENERATE
BYTE-HOUR USAGE
OF EACH CHUNK
IN ACCOUNT

542

RECEIVE INPUT FROM ROUTINE 520 (FIG. 5B)

544

RECEIVE INPUT FROM ROUTINE 530 (FIG. 5C)

546

PERFORM LEFT JOIN AND MAP JOB TO REMAP ENCRYPTED CHUNKS TO
THEIR UNENCRYPTED COUNTERPARTS

548

RUN A REDUCE STEP TO DETERMINE THE OLDEST COMPLETED SNAPSHOT
AND THE BYTE-HOUR USAGE OF EACH PARTITION

END

DATA EQUIVALENCY SYSTEM USING CO-PAIR MANIFESTS FOR IDENTIFYING DUPLICATES IN GENERATIONS OF RESOURCES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual hard drives for compute resources, object storage services that act as network-accessible data stores, and the like. As the number of users of cloud services grows, the amount of data held and maintained by the cloud services can become very large. To ensure correct operation of cloud services, a provider can undertake a variety of processing tasks with respect to that data. For example, a provider may encrypt stored data to ensure it is stored securely, conduct garbage collection to ensure unused data is not unnecessarily stored, or conduct a resource usage audit to ensure that resources are appropriately allocated between users or determine which users have utilized which cloud resources. When the volume of data held and maintained by a cloud service grows large, these processing tasks can themselves utilize significant computing resources.

BRIEF DESCRIPTION OF THE DRAWINGS

FIG. 3B depicts illustrative contents of manifests that could be queried or generated by a data equivalency system for a subset of the snapshots depicted in FIG. 3A.

FIG. 5A depicts an illustrative usage metering routine of a metering system making use of co-pair manifests from a data equivalency system implemented on the cloud provider network of FIG. 1 in accordance with aspects of the present disclosure.

DETAILED DESCRIPTION

Figure 1:
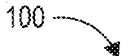
FIG. 1 depicts a schematic diagram of a cloud provider network in which various embodiments according to the present disclosure can be implemented.

Generally described, aspects of the present disclosure relate to the identification of data equivalencies and/or duplication existing amidst object-based "snapshots" for cloud-based block storage volumes. Cloud-based block storage volumes may represent virtualized storage drives used by, for example, virtual machines. Each object-based snapshot can reflect a point-in-time representation of a block storage volume, with the snapshot being stored as separately from the block storage volume as a set of objects on an object storage service. For example, an object-based snapshot may be viewed conceptually as a "copy" of the volume (as it existed at a given point in time) stored as a set of files on a network-accessible storage service. Each snapshot may be associated with a manifest (referred to throughout as a "main manifest") that lists the objects making up the data of the snapshot, such that a system can access the main manifest to identify the objects and re-create data of the snapshot. Object-based snapshots and their underlying block storage volumes may be encrypted or unencrypted and may exist in hierarchy relationships reflected by a tree data structure. In some examples, encrypted object-based snapshots may inherit data from unencrypted object-based snapshots in such hierarchies. This structure can result in administrative complications when encryption masks the exact nature or extent of the incremental changes that occur within the data of such snapshots from one generation to the next. Thus, encryption creates challenges for the deduplication of data intergenerationally between object-based snapshots.

More specifically, while deduplicating data between two unencrypted object-based snapshots may be a fairly straightforward task (e.g., a comparison of the data of the underlying blocks provides the same hash value), encryption of object-based snapshots and their underlying block storage volumes eliminates the ability to simply compare underlying plaintext data of two encrypted snapshots for purposes of deduplication. Rather, two encrypted snapshots could represent copies of the same data originally sourced from the same block storage volume, but the snapshots would still have underlying plaintext data represented by different bits due to their encryption, removing the ability to conduct a plaintext comparison. Further, attempting to compare two encrypted snapshots through the process of decryption of each snapshot may be either too resource-intensive or not possible (e.g., without access to the relevant cryptographic keys).

As discussed in more detail herein, while encryption may make two snapshot objects appear to be sourced from entirely different blocks, a special kind of manifest called a "co-pair manifest" may identify data equivalencies shared between objects listed by the snapshots. For example, a data equivalency may be found between an encrypted object and an unencrypted object sourced from the same block of a block storage volume through the generation of a co-pair manifest. More specifically, aspects of the present disclosure relate to generating a co-pair manifest to identify data equivalencies across generations of object-based snapshots that may or may not be encrypted.

Particularly in large systems storing user data (e.g., storing hundreds, thousands, or millions of snapshots), proper security measures such as encryption are critical to the safety and reliability of user data. Even though security-critical, applying encryption to block storage volumes storing user data can result in challenges to the accurate metering of usage of cloud-based resources. In order to accurately meter usage of cloud-based storage, a cloud provider network may be required find a solution to de-duplicate a listing of objects referenced across a set of snapshots, such that the listing of objects be processed contains only unique objects. In this way, a cloud provider network can avoid undesirable "double-counting" of resource usage (e.g., incorrectly counting a first encrypted snapshot and its source unencrypted snapshot as two different snapshots, containing what appears to be different underlying data). One way to avoid double-counting and achieve deduplication may be to obtain manifests including the main manifest and the co-pair manifest of each snapshot, combine a listing of objects in each manifest, and deduplicate that listing with the aid of the equivalencies found in the co-pair manifest to result in a set of unique objects for accurate metering and maintenance of data heredity.

Aspects of the present disclosure provide for more efficient and accurate metering of usage of cloud-based resources, even when certain data transformation (e.g., transparent encryption or any other encryption scheme) is applied to the underlying user data. As discussed herein, co-pair manifests may be generated by a data equivalency system to identify duplication in seemingly disparate transformed data coming from a single block storage source. In this way, a data equivalency system provides a solution to more accurately deduplicate data (e.g., for metering usage of cloud-based resources, securely conducting garbage collection services with knowledge of what data is actively in use, or other administrative tasks relying on data deduplication) while prioritizing the security and reliability of user data.

Generally described, a main manifest for a snapshot refers to data that lists the objects that make up the snapshot. For example, a snapshot of a 1-gigabyte (GB) drive may be divided into 1000 distinct 1-megabyte (MB) "chunks" (which may alternatively be referred to as blocks, portions, etc.), with each chunk being stored as a distinct object on an object storage service. Each chunk can be assigned an identifier, such that it can be retrieved from the object storage service using the identifier. To enable retrieval of the snapshot (e.g., for use in provisioning a new virtual hard drive), a system can create a main manifest that lists the 1000 distinct chunks by their identifier on the system, potentially along with other metadata (such as the size of each chunk). Thus, a system can open the main manifest and retrieve the listed objects to retrieve the snapshot.

A system may also provide for incremental snapshots, such that such that a given snapshot stores only changes made to a volume since a prior snapshot. Illustratively, a user may create an object-based snapshot of a volume at a first point in time, causing a set of objects to be stored that reflect the data of the volume at that point in time. The user may then make changes to the volume, and request at a second point in time that a second snapshot be created. Rather than making another complete copy of the volume, the system may make a copy of only the changes made to the volume since the first snapshot. By combining those changes with the data of the first snapshot, the data of the volume at the second point of time can be re-created. A distinct manifest can be created for each snapshot, with each manifest listing the objects that make of the data of the respective snapshot. Because the second snapshot relies on at least some data of the first snapshot, the second manifest may refer to at least some objects also referred to in the first snapshot. Use of incremental snapshots can facilitate more rapid creation of snapshots, since the amount of data stored for each snapshot is reduced. However, the multiple dependencies created by incremental snapshots can make it more difficult to determine a unique set of objects referred to be all snapshots, increasing the amount of data reviewed to identify that unique set of objects and in some cases necessitating deduplication of a listing of objects.

In addition to a main manifest, the system may provide for a second type of manifest called a "differential manifest." As discussed herein, a differential manifest can include a listing of objects that are unique to a given snapshot relative to a prior snapshot on which the given snapshot depends. As an example, consider an instance in which a first snapshot is logically represented by a set of objects $\{A_1, B_1, C_1\}$, and a second snapshot is represented by objects $\{A_1, B_2, C_1\}$, with $B_2$ representing a different object than $B_1$. In such a case, the main manifests for each snapshot may reference the full set of objects of each snapshot, while a differential manifest for the second snapshot may list only $B_2$, as that is the sole object of the second snapshot that differs from the objects of the first snapshot. This creation of a differential manifest simplifies identification of a unique set of objects referenced across the two snapshots. More specifically, the unique set of objects may be determined by combining the objects listed in the main manifest of the first snapshot with the objects listed in the differential manifest of the second object.

In the example above, it is assumed that the first snapshot is not an incremental snapshot. Thus, it may not be associated with a differential manifest or may be associated with a differential manifest containing a listing of no objects. However, it is equally possible that the first snapshot is incremental relative to a still prior snapshot. In such a case, the first snapshot can also be associated with a differential manifest listing objects of the first snapshot that differ relative to the still prior snapshot. A listing of objects unique across all three snapshots can be obtained by combining the main manifest of the initial (non-incremental) snapshot with the differential manifests of each incremental snapshot.

For ease of reference, the present disclosure will refer to relationships between incremental snapshots by arranging such relationships within a tree data structure. A first, non-incremental snapshot can represent the root node of the tree, and each incremental snapshot created from a snapshot of a given node can be represented as a child node to that given node. Nodes in a tree can be referred to using familial terminology, e.g., "parent" and "child" to refer to a first snapshot and a second snapshot that increments of the first snapshot, "grandparent" to refer to a still prior snapshot to the first snapshot, etc. While snapshots within any given lineage are typically expected to be time-ordered, this may not hold true across different branches of a relationship tree. For example, a user may create a child and grandchild snapshot from a given parent snapshot, and then at a later point in time revert a volume to the state of the parent snapshot to create other child snapshots. Thus, complex familial relationships can exist between snapshots. Nevertheless, each incremental snapshot can be described as a set of differences relative to an immediate parent snapshot.

In addition to main manifests and differential manifests, the present disclosure provides for a third type of manifest called a co-pair manifest. Generally described, a co-pair manifest can be used by the system to identify blocks created due to data transformation (e.g., encryption), potentially not just between two immediately related snapshots, but across all generations of snapshots. For example, in a system transitioning to transparent encryption of block storage volumes, some volumes may be created from earlier generations of snapshots of unencrypted parent volumes, while other volumes may be created from more recent generations of snapshots of encrypted parent volumes. In a system containing both encrypted and unencrypted volumes, a solution may be required to accurately maintain the heredity relationships of both volumes' snapshots such that an encrypted volume's snapshot and an unencrypted volume's snapshot sourced from the same grandparent source snapshot are still recognized as sharing the same source. Because encryption masks the duplicate nature of such snapshots in this example, a co-pair manifest may keep track of this data equivalency by maintaining a list of object paths to the source chunks of a given snapshot. In this way, a co-pair manifest may serve as a separate file or reference tracker in some embodiments.

In some examples, co-pair manifests may be useful in the context of garbage collection services within the cloud provider network. In the context of garbage collection services, data in use must be protected from deletion. However, if a second copy of the data in use exists in an encrypted form, garbage collection services may thus be safe to delete the unencrypted copy of such data. In alternative examples, co-pair manifests become useful in the context of metering usage of cloud-based resources. Such metering may take place, for example, within the bounds of a user account, summing the byte-hour usage of constituent chunks by the user in that account. In such an example, if a chunk is shared between multiple snapshots of the same account, its usage may be allocated to the oldest completed snapshot in the account that contains the chunk and is eligible for metering. It is within this process of determining the oldest eligible snapshot that a co-pair manifest can be used to ensure this determination is accurate, taking into account duplicate data masked by transformations such as encryption.

At times, transformations to data (e.g., encrypting block storage volumes with transparent encryption) may be necessary security measures requiring implementation across cloud provider networks of even the largest scale. Such transformations require implementation without impact to the user experience or cost. In fact, transparent encryption is entirely "transparent" to the user in day-to-day use. However, if implementation of transparent encryption were implemented in block storage volumes of a cloud provider network without accounting for duplication, encryption of previously unencrypted volumes would appear from a usage metering perspective to be creating entirely "new" user snapshots (e.g., new user snapshots the user never requested). Such "new" user snapshots created by implementation of a data transformation measure such as transparent encryption would increase user costs and create friction in the user experience. As such, the present disclosure provides a solution to bypass this friction and avoid cost to the user by identifying data equivalencies in object-based snapshots through co-pair manifests, thus avoiding the undesirable metering experience of seemingly "new" encrypted snapshots being charged to the user account.

In light of the present disclosure, the embodiments disclosed herein improve the ability of computing systems, such as cloud computing systems utilizing object-based snapshots, to protect underlying data stored by cloud-based resources with encryption while still allowing for accurate maintenance of heredity relationships amidst the encrypted object-based snapshots. Maintaining heredity relationships amidst encrypted snapshots allows for accurate resource usage metering and other similar administrative actions that must avoid a "double-count" of duplicate data. Moreover, the presently disclosed embodiments address technical problems inherent within computing systems; specifically, the limited nature of computing resources in processing data and the difficulty of retrieving and deduplicating large amounts of scalable data within object-based snapshots. By generating co-pair manifests with a data equivalency system, decrypting every object-based snapshot is not required in order to determine its source for metering or other administrative action. This overcomes current technological limitations causing issues of data security, reliability, performance, scalability, and cost to the cloud provider and the user. As described in more detail herein, this solution generates and uses co-pair manifests for identifying duplicate data in a set of object-based snapshots, as well as using full, differential, and co-pair manifests in combination to maintain heredity relationships across multiple generations of object-based snapshots. Thus, the present disclosure represents an improvement on computing systems utilizing object-based snapshots and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, and other server configurations (not illustrated) for supporting on-demand cloud computing services. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing services to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane func- tionality can provide an elastic block store service of the cloud provider network 120. Data of volumes 106 may be encrypted or unencrypted.

The block store servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 KB, 128 KB, 256 kB, 512 KB, or larger, depending upon the implementation.

User volumes 106, which can be treated as an individual hard drive ranging for example from 1 GB to 1 terabyte TB (or more) in size, are made of one or more blocks stored on the block store servers 105. Although treated as an indi- vidual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be "attached" to an instance 116 running on a compute server 115, and can be detached from that instance 116 and re-attached to another. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by specialized hardware or software executing on compute servers 115 (which special- ized hardware or software is sometimes referred to as a block store server "client") that operates to obtain mass storage operations (e.g., according to the Serial AT Attach- ment (SATA) protocol or other known storage protocols) and pass corresponding operations to the block storage services 105 for implementation, such that it appears from the point of view of an instance 116 that volumes 106 represent local disk drives. The client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualiza- tion host may be used for some virtualization management components. Such an offload card of the host can include one or more CPUs that are not available to user instances, but rather are dedicated to instance management tasks such as virtual machine management, input/output virtualization to network-attached storage volumes, local migration management tasks, instance health monitoring, and the like. The block store servers 105 may have built-in redundancy for volumes by replicating the volume across multiple servers within an availability zone, which means that volumes will not fail if an individual drive fails or some other single failure occurs.

The object storage servers 110 represent another type of storage within the cloud provider network 120. The object storage servers 110 and associated control plane function- ality can provide an object-based storage service of the cloud provider network. Object-based storage services can be referred to as a blob storage service, cloud object storage service, or cloud storage service, in various implementa- tions. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block- based storage, where input/output (I/O) operations typically occur via a mass storage protocol like SATA (though poten- tially encapsulated over a network), interactions with the object storage servers 110 may occur via a more general network protocol. For example, the servers 110 may facili- tate interaction via a Representational State Transfer (REST) application programming interface (API) implemented over the Hypertext Transport Protocol (HTTP). The object stor- age servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associ- ated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block store servers 105, as the object storage servers 110 can automati- cally replicate data into multiple availability zones. The object storage servers 110 also have different data through- put than the block store servers 105, for example around 20 Mbps for a single stream of data.

While the object storage servers 110 can be used inde- pendently from the instances 116 and volumes 106 described above, they can also be used to provide data backup as described herein with respect to object-based snapshots (e.g., object-stored backups of volume data). For example, and as described in more detail below, data of a volume 106 may be represented as one or more objects stored within the object storage servers 110 (with each object representing one or more blocks of the volume 106) along with one or more manifests identifying the objects. Together, the objects and manifests can logically represent a point-in-time representation of the volume 106 referred to herein as an object-based snapshot.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Figure 2:
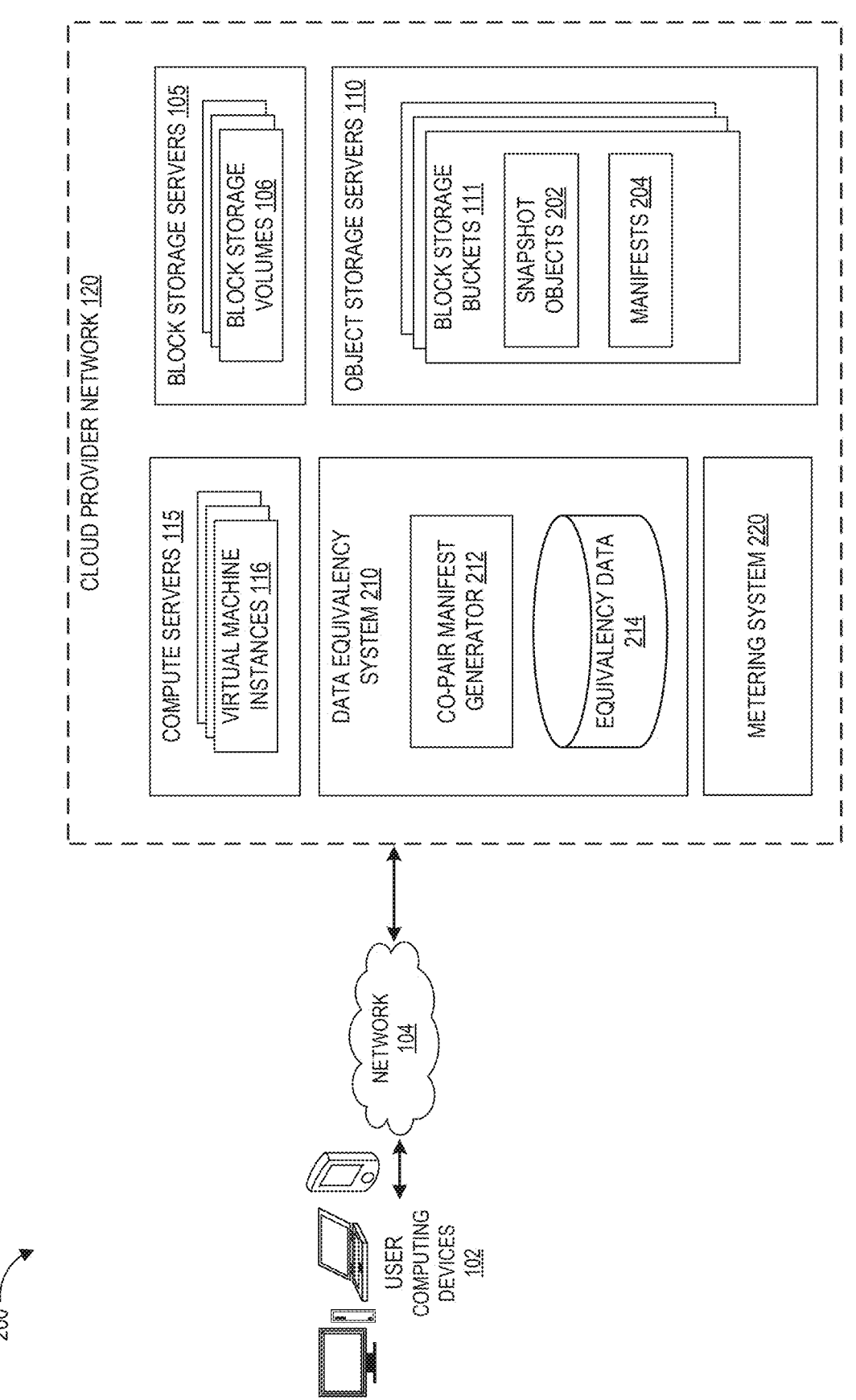
FIG. 2 depicts a schematic diagram of a network environment in which the cloud provider network of FIG. 1 implements a data equivalency system to generate co-pair manifests for object-based snapshots in accordance with aspects of the present disclosure.

FIG. 2 depicts a computing environment 200 in which a data equivalency system 210 is implemented on the cloud provider network 120. The data equivalency system 210 may run tasks with data equivalency servers (a specific implementation of compute servers 115, in some embodiments). The data equivalency system 210 can implement a variety of tasks with respect to snapshots stored on the object storage servers 110, including identification of data equivalencies within snapshot objects 202, generation of co-pair manifests through the co-pair manifest generator 212, and generation of equivalency data 214 to be used as input for resource usage metering and other administrative purposes. Such tasks may illustratively be implemented asynchronously to user-facing or administrative snapshot operations (e.g., creation of a snapshot from a volume 106, creation of a volume 106 from a snapshot, deletion or copying of a snapshot, etc.). For example, in some embodiments, a co-pair manifest may be generated each time a first encrypted snapshot is created for an encrypted volume originating from an unencrypted volume. As such, the creation of the co-pair manifest may happen asynchronously from the creation of this first encrypted snapshot. Similarly, in some embodiments, a user action taken (e.g., creating a snapshot) could result in an asynchronous creation of the related co-pair manifest.

To facilitate identification of incremental and non-incremental snapshots, the data equivalency system 210 further includes equivalency data 214. The equivalency data 214 may be stored, for example, as object data in object storage servers 110. In alternative embodiments, equivalency data 214 may be stored as data within a relational database or other formats such as file storage in a file server. Illustratively, the equivalency data 214 may include, for each snapshot, an indication of whether the snapshot is incremental relative to another active snapshot, or non-incremental (e.g., not a child to any active snapshot). The equivalency data 214 may also include other information, such as a volume represented by the snapshot, a point-in-time of creation of the snapshot, an owner of the snapshot, an active time of the snapshot, identification of a parent snapshot, a number of objects that represent the snapshot, a number of unique objects relative to a parent snapshot (if any), etc. As discussed in more detail below, the data equivalency system 210 may be configured to identify incremental and non-incremental snapshots using the equivalency data 214, to retrieve manifests 204 for these snapshots, to identify data equivalencies with respect to objects corresponding to the snapshots, and then to generate co-pair manifests.

In some examples, the co-pair manifest generator 212 creates a co-pair manifest for the first encrypted snapshot in the family tree originating an unencrypted snapshot. For subsequent encrypted snapshots incremental to the first encrypted snapshot, the co-pair manifest from the parent encrypted snapshot will be inherited by the child encrypted snapshots and only updated incrementally as required. As will be discussed in further detail, in anticipation of applications such as usage metering, the data equivalency system 210, in conjunction with the metering system 220, may query all references to co-pair manifests for snapshots 202 eligible for metering, open up all manifests 204 related to those snapshots 202, and perform data equivalency replacements with relevant co-pair manifests at this step in the process. The co-pair manifest generator 212 may run tasks as a service within the cloud provider network 120 (a specific implementation of compute servers 115, in some embodiments).

As mentioned above, FIG. 2 also depicts a metering system 220 which may act alongside the data equivalency system 210 to gather data for and meter usage of resources within the cloud provider network 120. The metering system may illustratively be implemented with technologies such as Apache Spark or other related frameworks allowing the metering system to run jobs according to a MapReduce paradigm. The metering system 220 may receive input in the form of data from sources such as the data equivalency system 210, object storage servers 110, or block storage servers 105. The metering system 220 may use such input to calculate resource usage in large scalable environments comprising trillions of chunk references. With the aid of the data equivalency system 210, as will be discussed in this disclosure, the metering system 220 allows for accurate measurement of resource usage even in the context of data transformation and duplication within the cloud provider network 120.

Figure 3A:
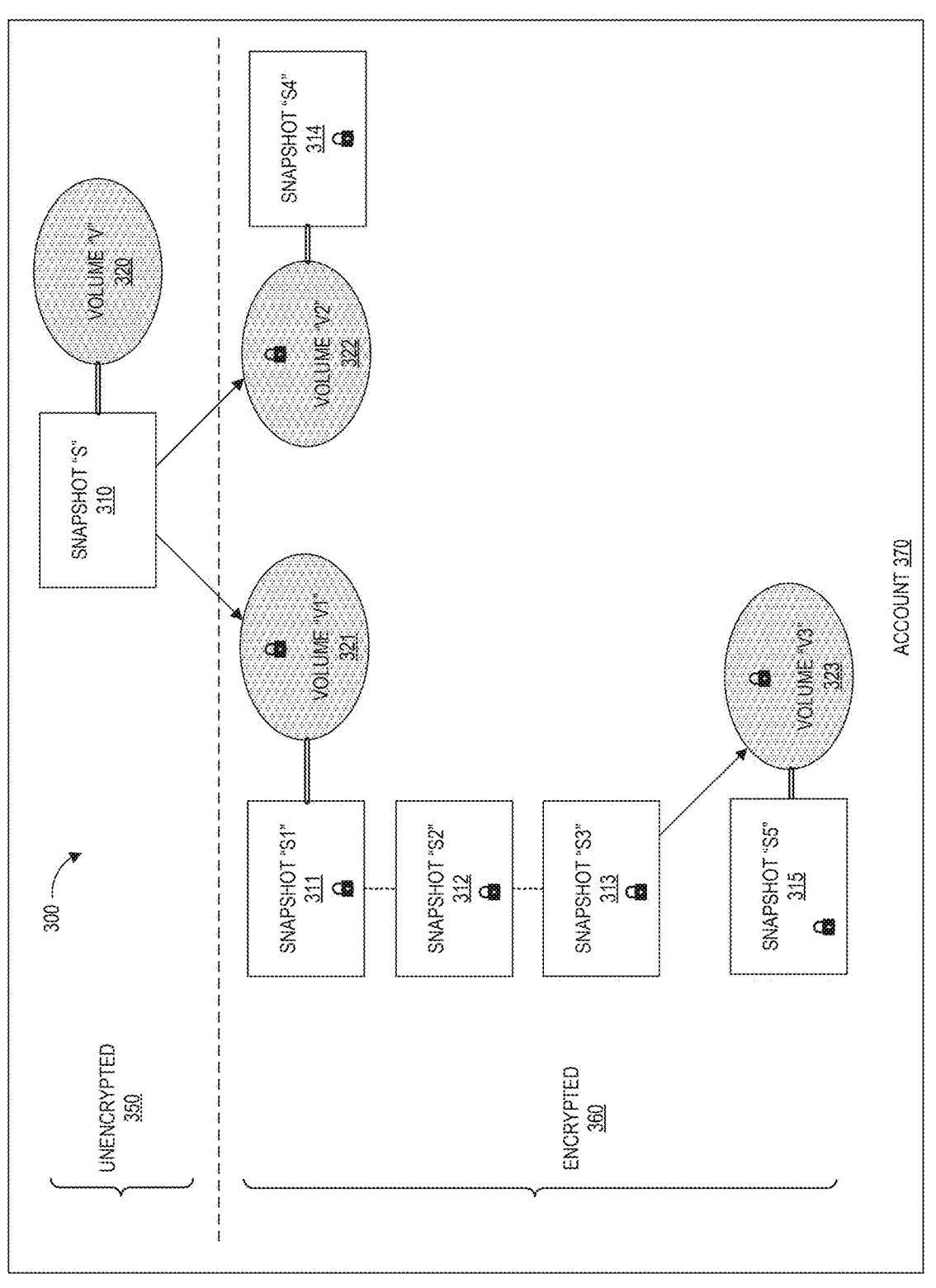
FIG. 3A is an illustrative visualization of encrypted block-storage volumes created from a snapshot of an unencrypted block-storage volume and the resulting snapshots of the encrypted block-storage volumes across multiple generations.

To further illustrate the concept of block storage volumes 106 and their associated snapshot objects 202 in the context of a data equivalency system 210, FIG. 3A provides an illustrative visualization 300 of the familial relationships between these cloud-based resources of the cloud provider network 120. Illustrative visualization 300 depicts all resources within a user account 370 which will be later metered for resource usage, as discussed elsewhere in this disclosure. Further, this visualization 300 depicts unencrypted resources 350 above the dotted line and depicts encrypted resources 360 below the dotted line. Encrypted resources 360 are additionally denoted with an image of a lock.

In FIG. 3A, unencrypted Volume V 320 is identified alongside its unencrypted Snapshot S 310. Volume V 320 may represent a block-storage volume, such as volume 106 of FIG. 1. Snapshot S 310 may represent a point-in-time backup of Volume V 320, thus serving as an example of a snapshot object 202 found in the block storage buckets 111 of FIG. 2. The relationship of Snapshot S 310 as the point-in-time backup of Volume V 320 in object storage is represented visually by a double connecting line between the two resources. Snapshot S 310 will serve as the source snapshot from which all other snapshots in FIG. 3A emerge as children (or more distant generational dependencies).

Moving below the dotted line of FIG. 3A to the first generation of encrypted resources 360, unencrypted Snapshot S 310 is used to create encrypted Volume V1 321 and encrypted Volume V2 322. In some embodiments, the creation of the first generation of encrypted volumes from an unencrypted source snapshot represents the implementation of a data transformation effort by the cloud network provider 120 (e.g., the implementation of transparent encryption for newly created block storage volumes). The cloud provider network 120 may use cryptographic keys it owns internally to implement transparent encryption. Notably, the cloud provider network 120 may opt to use two distinct cryptographic keys to separately encrypt Volume V1 321 and Volume V2 322, even though these volumes are identical copies of one another and their source Snapshot S 310 at this point. Because Volume V1 321 and Volume V2 322 may be encrypted with separate keys, the resulting encrypted data of these volumes will not appear to be duplicate data.

A first encrypted snapshot, Snapshot S1 311, is then taken of Volume V1 321. Again, the relationship between Volume V1 321 and its Snapshot S1 311 is represented by a double connecting line. Encrypted Snapshot S1 311 may now be considered a child snapshot of unencrypted Snapshot S 310. In this example, the user then applies incremental changes to Volume V1 321, which are captured in Snapshot S2 312, a child snapshot of Snapshot S1 311. At another later point in time, the user again makes incremental updates to Volume V1 321, resulting in another encrypted snapshot: Snapshot S3 313. Snapshot S3 313 is thus a child snapshot of Snapshot S22 312 and a grandchild snapshot of Snapshot S1 311.

Notably, Snapshot S2 312 is a second-generation encrypted snapshot resulting not from the implementation of an encryption scheme, but rather from a user action (e.g., updating Volume V1 321). Similarly, Snapshot S3 313 is a third-generation encrypted snapshot resulting from a user action. For this reason, in some embodiments, as will be discussed in further detail in this disclosure, when it comes time to meter resource usage, the user will be metered for the incremental updates captured in Snapshot S2 312 and Snapshot S3 313. However, the user will not be metered for the creation of Snapshot S1 311, which is the first-generation encrypted snapshot reflecting an encrypted volume (e.g., Volume V1 321) created by an unencrypted snapshot (e.g., Snapshot S 310). In this way, the user is not responsible for snapshots outside of their control.

Next, the user uses Snapshot S3 313 to create a new volume, Volume V3 323. In this way, Volume V3 323 is the next generation volume after Volume V1 321, although Volume V3 323 notably also includes the incremental updates the user made up through Snapshot S3 313. As will be discussed in more detail, Volume V3 323 will also inherit the root co-pair manifest created for Snapshot S1 due to its generational lineage from Volume V1 321. After Volume V3 323 is created from Snapshot S3 313, a snapshot is taken of Volume V3 323: Snapshot S5 315. In this way, Snapshot S5 315 becomes the point-in-time backup of Volume V3 323. Because Snapshot S3 313 and Snapshot S5 315 will (at this point) contain equivalent underlying source data, the user will not be metered for the additional cost of Snapshot S5 315 as a new and separate snapshot; its equivalency with its parent Snapshot S3 313 will prevent it from being "double-counted."

Encrypted Volume V2 322 also is captured by a snapshot, Snapshot S4 314. Encrypted Snapshot S4 311 may now be considered a child snapshot of unencrypted Snapshot S 310, capturing the same underlying source data as Snapshot S1 311. However, in some examples, due to its separate cryptographic scheme, Snapshot S4 314 will appear to capture entirely different data than Snapshot S1 311. For this reason, as will be discussed in this disclosure, the data equivalency system 210 may use its co-pair manifest generator 212 to create a co-pair manifest to map this data equivalency between Snapshot S1 311 and Snapshot S4 314, in order to accurately capture the heredity of the data and the resource usage for metering.

In an alternative embodiment (not pictured), the user may choose to make copies of snapshots depicted in FIG. 3A. In such an example, if a user copies a snapshot in the same region across accounts (e.g., from Account 370 to another account in the same region), the snapshot may be re-encrypted with a key owned by the cloud provider network 120. Similarly to other examples previously discussed, such encryption will make this copied snapshot appear to contain different underlying data and could result in a double-count while metering resource usage. Thus, the data equivalency system 210 can also address such an example by creating a co-pair manifest for a snapshot copied in region across accounts by a user. In this way, co-pair manifests serve as a solution not just for the first generation of encrypted snapshots from unencrypted snapshots, but also serve as a similar solution for user copies of snapshots in certain scenarios that would otherwise result in a double-count due to encryption. In some examples, this means that the data equivalency system 210 will create a co-pair manifest every time a parent snapshot is encrypted under a network-owned cryptographic key and the current snapshot at hand is also encrypted with a network-owned key. This can be determined by the data equivalency system 210 using certain metadata, as will be discussed in further detail in conjunction with FIG. 4.

FIG. 3B depicts illustrative contents of manifests that could be queried or generated by a data equivalency system 210 for a subset of the snapshots depicted in FIG. 3A. A user associated with Volume V 320 may illustratively create Volume V 320 in an initial state (with blocks 1-5 containing some initial set of data defined by the user), and then take a snapshot of Volume V 320 (e.g., Snapshot S 310). As a result, the object storage servers 110 may create a set of objects that contain the data of Volume V 320 in its initial state. In FIG. 3B, each block of the Volume V 320 is illustratively represented by a single object in the object storage service. Thus, block 1 is represented as "object_1", block 2 is represented as "object_2", etc.

In FIG. 3B, both Volume V 320 and Volume V1 321 from FIG. 3A are depicted. Because Volume V1 321 was created from Snapshot S 310, Volume V1 321 in its initial state can be understood to store a copy of the same source data (e.g., plain text data) stored in source blocks 1-5 of Volume V 320. In both volumes of FIG. 3B, Blocks 1-5 correspond to a fixed-length segment of bits (e.g., 512 KB in length). While 5 blocks are shown in each volume of FIG. 3B, a volume may be associated with any number of blocks, and the representation of FIG. 3B is simplified for ease of description and depiction.

FIG. 3B depicts two main manifests of snapshots from FIG. 3A generated by the network 120. Starting with the first manifest, Main Manifest 340 of Snapshot S 310 lists the objects making up the data of Volume V 320 in its initial state. Each object may be identified as a location on the object storage service, e.g., "object_1" within the directory "S" (representing Snapshot S 310). For ease of the reader, the encryption status of the object is also included in the naming convention, although this may not be the case on an actual main manifest. With these three factors combined, for the purposes of the discussion of FIG. 3B, the line in Main Manifest 340 corresponding to the data of Block 1 of Volume V 320 reads "S_UNENCRYPTED_OBJECT_1" (i.e., Snapshot S 310, unencrypted, object 1). In this way, by obtaining the Main Manifest 340 and the objects identified therein, a system may re-create the initial state of the Volume V 320.

Turning now to the other main manifest depicted in FIG. 3B, Main Manifest 341 of Snapshot S1 311 lists the objects making up the data of Volume V1 321 in its initial state. For example, the data of Block 1 of Volume V1 321 is repre- sented by the line "S1_ENCRYPTED_OBJECT_1." In this way, line 1 of Manifest 341 represents the encrypted copy of the unencrypted data represented in line 1 of Manifest 340. Volume V1 321 also has another snapshot depicted in FIG. 3B: Differential Manifest 342. Differential Manifest 342 of incremental Snapshot S2 312 lists the objects updated in an incremental change by the user to Volume V1 321, as discussed in connection with FIG. 3A. For this reason, FIG. 3B depicts Block 3 and Block 4 of Volume V1 321 with a striped background, providing a visual representation of the fact that the user made a change to Volume V1 321 at the time leading up to Snapshot S2 312. Because the user made only an incremental change to only two blocks of Volume V1 321 in this example, only two objects listed in are Differential Manifest 342: "S2_ENCRYPTED_OBJECT_3" and "S2_ENCRYPTED_OBJECT_4" (tied to Blocks 3 and 4, respectively). As discussed throughout this disclosure, since Snapshot 2 312 is a second-generation encrypted snapshot, the user will be metered for this incremental change, but only this incremental change (and not for Snapshot S1 311).

Notably, the object-based snapshots illustrated in FIG. 3B differ significantly from other snapshot techniques, such as disk-based snapshots. As used herein, the term "disk-based snapshot" is intended to refer to a snapshot technique in which pointers on a storage device are used to enable reversion of a volume to a prior state, without requiring copying of data of the volume. For example, with a disk-based snapshot, a system may map blocks of a volume to specific portions of a storage device. When a snapshot is taken, the system may create a reference to portions of the storage device that contain data of the volume at that point in time and disallow writing to those portions. Instead, subsequent writes to the volume are stored in another location of the storage device, and the system re-maps written blocks of the volume to the other locations. In this manner, the volume can be reverted to the prior point in time by reverting the mapping of the later-written blocks, such that the mapping refers back to the portion of the storage device that held data of the blocks prior to the writes. Disk-based snapshots do have some advantages over object-based snapshots, such as avoiding a need to copy data of the volume when a snapshot is created. However, these advantages are significantly outweighed in a cloud environment by corresponding disadvantages, such as lack or portability or resiliency. Thus, the term "snapshot" as used herein is generally intended to refer to object-based snapshots, in which data of a volume is replicated to a set of objects stored separately from the volume, in contrast to disk-based snapshots.

FIG. 3B also depicts a co-pair manifest generated by the co-pair manifest generator 212 of the data equivalency system 210. Co-Pair Manifest 345 is linked to Snapshot S1 311 and (as represented by the arrow from Main Manifest 341 to Co-Pair Manifest 345) this co-pair manifest captures data equivalencies contained in Snapshot S1 311 (specifi- cally, the data equivalencies between Snapshot S1 311 and its parent snapshot, Snapshot S 310). For purposes of illustration, data equivalencies in the co-pair manifests of FIG. 3B are represented by the symbol "=". In this way, the earlier-discussed equivalency between line 1 of Main Mani- fest 340 and line 1 of Main Manifest 341 is represented by line 1 of Co-Pair Manifest 345: "S_UNENCRYPTED_OBJECT_1=S1_ENCRYPTED_OBJECT_1." Similar equivalencies are noted for Blocks 2-5 as captured by Snapshot S1 311.

Although only Differential Manifest 342 is depicted in FIG. 3B for Snapshot S2 312, it is worth noting that Snapshot S2 would also have a main manifest (not pictured) that captures the entirety of its data (much of which would be copies of what already existed in Snapshot S1 311). Snapshot S2 312 would rarely need its entire main manifest, as use of Differential Manifest 342 allows for a more efficient and less storage-intensive data hierarchy. It is worth noting that Snapshot S2 312 does not need another co-pair manifest created separately for its equivalencies. Instead, Snapshot S2 312 has an object that points to the root co-pair manifest within its generation, in this case, Co-Pair Manifest 345. This is represented visually in FIG. 3B using an arrow from Differential Manifest 342 to point to Co-Pair Manifest 345, the root co-pair manifest in this generation. In this way, all 5 blocks of equivalencies (or lack thereof) between Snapshot S2 312 and its source grandparent snapshot, Snap- shot S 310 may still be captured by inheritance. Meanwhile, certain breaks in equivalency also exist due to the afore- mentioned incremental changes carried out by the user to blocks 3 and 4 of Volume V1 321. For example, because "S_UNENCRYPTED_OBJECT_3" does not equal "S2_ENCRYPTED_OBJECT_3" (and similarly, "S_UNENCRYPTED_OBJECT_4" does not equal "S2_ENCRYPTED_OBJECT_4"), the user would be metered only for those blocks' lack of equivalency, respec- tively, as reflected in the root Co-Pair Manifest 345.

Figure 4:
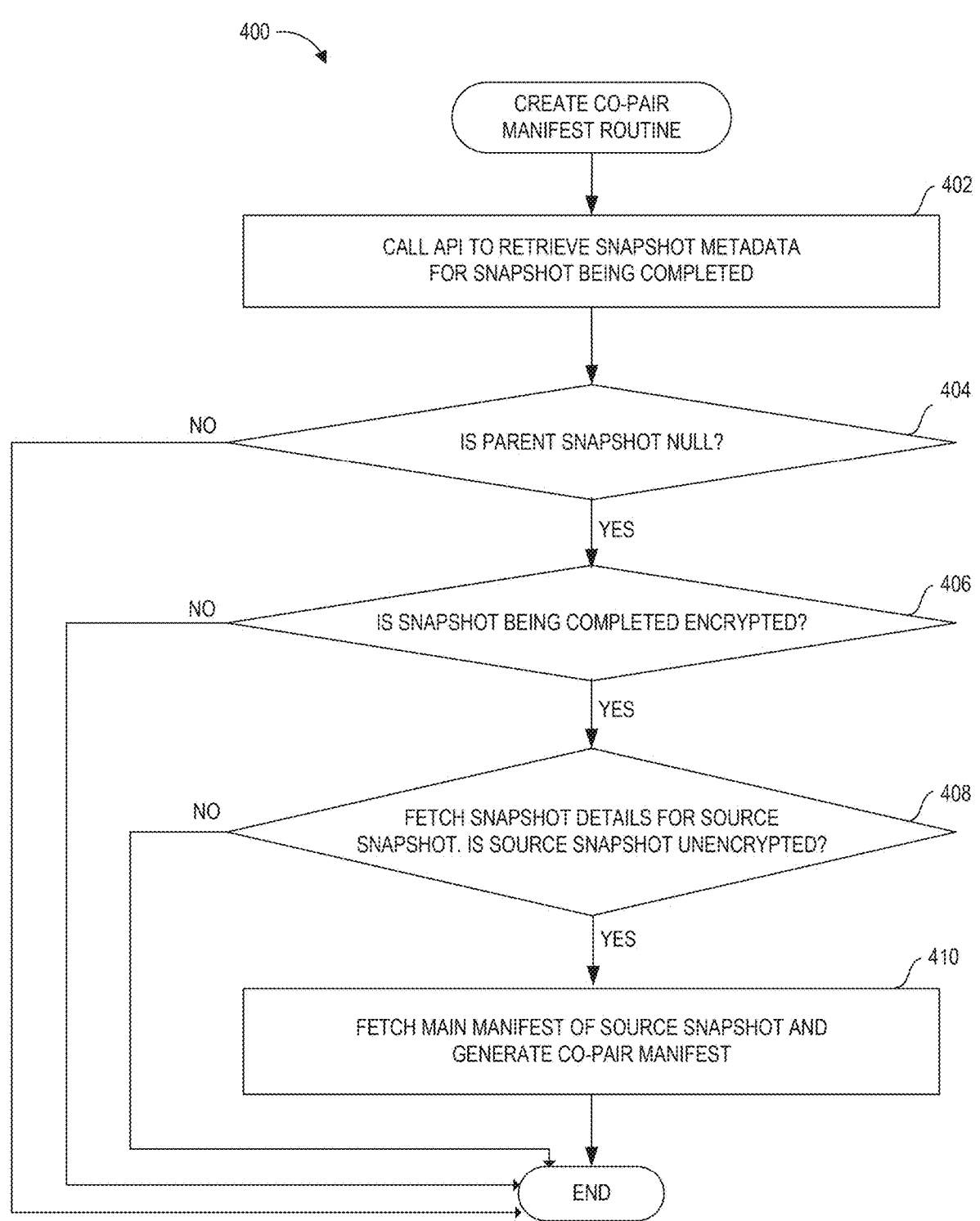
FIG. 4 depicts an illustrative routine demonstrating logic for the creation of a co-pair manifest by a co-pair manifest generator of a data equivalency system in accordance with aspects of the present disclosure.

FIG. 4 depicts an illustrative routine 400 demonstrating logic for the creation of a co-pair manifest by the co-pair manifest generator 212 of the data equivalency system 210, in accordance with aspects of the present disclosure. In some embodiments, routine 400 generates a co-pair manifest (e.g., Co-Pair Manifest 345) for the first snapshot (e.g., Snapshot S1 311) of an encrypted volume (e.g., Volume V1 321) created from an unencrypted snapshot (e.g., Snapshot S 310). Routine 400 creates a co-pair manifest (e.g., Co-Pair Manifest 345) during the concurrent creation of a corre- sponding snapshot represented by the co-pair manifest (e.g., Snapshot S1 311). This snapshot is referred to throughout routine 400 as a snapshot that is "being completed." At a high level, routine 400 fetches snapshot details for a source snapshot (e.g., Snapshot S 310) if the source snapshot has no parent and the snapshot being completed (e.g., Snapshot S1 311) is encrypted. Although not described in this routine, similar routines in alternative embodiments may create co-pair manifests for cross-account copies made by a user of encrypted snapshots within the same region, as previously discussed.

The co-pair manifest creation routine 400 begins at block 402, when the co-pair manifest generator 212 calls an application programming interface (API) of the cloud pro- vider network 120 to retrieve snapshot metadata for a snapshot being currently completed. In some embodiments, snapshot metadata may include (but is not limited to) boolean fields capturing the following information about the snapshot being completed: whether the volume type is a block storage volume, whether the full snapshot is complete, whether the snapshot is encrypted by a network-owned key, whether a parent snapshot identifier is set for the snapshot, whether the volume source snapshot identifier is set, whether the volume source snapshot is encrypted, and/or whether there is a cross-lineage parent snapshot ID. Such information (among other examples not listed) may be used in various embodiments, including in some of the decision trees captured in FIG. 4 and discussed below.

At block 404, the co-pair manifest generator 212 uses the snapshot metadata gathered at block 402 to first determine whether an encrypted parent snapshot exists for the snapshot being completed. If this field is null, that may be an indication that this is the first encrypted snapshot in this particular familial lineage. As such, if the parent snapshot field is null, routine 400 continues to block 406. However, if the encrypted parent snapshot does exist for the snapshot currently being completed, then there is no need to create a new co-pair manifest (because a co-pair manifest can instead be inherited from an encrypted parent snapshot), and thus, the routine concludes at this branch. In some examples, an exception may exist for this path which would keep the routine from concluding, namely: if a parent snapshot is null, but a cross-lineage parent snapshot exists, a co-pair manifest may still be created (thus routine 400 would continue to block 406 rather than concluding).

If an encrypted parent snapshot exists, the routine continues to decision block 406 in which the co-pair manifest generator 212 determines whether the snapshot being completed is encrypted by using the metadata gathered at block 402. If the snapshot currently being completed is not encrypted, then there is no need to create a new co-pair manifest (because unencrypted data does not lead to the data duplication at issue in this routine and captured by co-pair manifests in this disclosure), and thus, the routine concludes at this branch. However, if the snapshot being completed is indeed encrypted, the routine continues to decision block 408. At decision block 408, the co-pair manifest generator 212 fetches the snapshot details for the source snapshot (e.g., Snapshot S 310) of the snapshot being completed (e.g., Snapshot S1 311). The co-pair manifest generator then determines whether the source snapshot (i.e., the snapshot capturing the original volume sourcing the blocks of data contained in the snapshot currently being completed) is unencrypted. If the source snapshot of the snapshot currently being completed is not unencrypted, the routine ends, because this is an indication that the snapshot currently being completed is not the first encrypted snapshot of an encrypted volume created from an unencrypted snapshot. However, if the source snapshot of the snapshot currently being completed is unencrypted, the co-pair manifest generator 212 has identified its intended use case: the first encrypted snapshot of an encrypted volume created from an unencrypted snapshot. With this confirmation, the routine proceeds to block 410 in which the co-pair manifest generator fetches the main manifest of the source snapshot (e.g., Main Manifest 340) and generates a co-pair manifest for the snapshot being completed (e.g., Co-Pair Manifest 345). With the creation of a co-pair manifest for the first encrypted snapshot of an encrypted volume created from an unencrypted snapshot, exemplary routine 400 concludes having addressed the need for co-pair manifest generation within a cloud provider network 120 implementing a data transformation such as transparent encryption.

FIG. 5A depicts an illustrative usage metering routine of a metering system 220 making use of co-pair manifests from a data equivalency system 210 implemented on the cloud provider network of FIG. 1 in accordance with aspects of the present disclosure. The illustrative resource usage metering routine 500 begins at block 502 when the metering system 220 queries for all snapshots eligible for resource usage metering within a given time interval. In some embodiments, the given time interval may be set, scheduled, or periodic, and alternatively, a time interval could be manually defined for a specific query or scenario. The time interval may represent a distinct interval of time in the past in which the metering system 220 is being used to meter resource usage for, delineated by a start and end time and date. The metering system 220 may query any storage system of the cloud provider network 120 used to store snapshots, such as snapshot objects 202. In some examples, ABS Redshift may be queried at block 502. The snapshots "eligible for metering" at block 502 include any snapshots containing chunks tied to resource usage (e.g., byte-hour usage of resources of the cloud provider network 120) during the given time interval.

At block 504, the metering system 220 runs a web service job (illustratively titled the "co-pair manifest job" for purposes of this disclosure) concurrently with a second web service job (illustratively titled the "general manifest job"). The co-pair manifest job is described by sub-routine 520 contained in FIG. 5B, and the general manifest job is described by sub-routine 530 contained in FIG. 5C. As such, FIGS. 5B and 5C will now be discussed in turn before returning to the next block of routine 500.

Figure 5B:
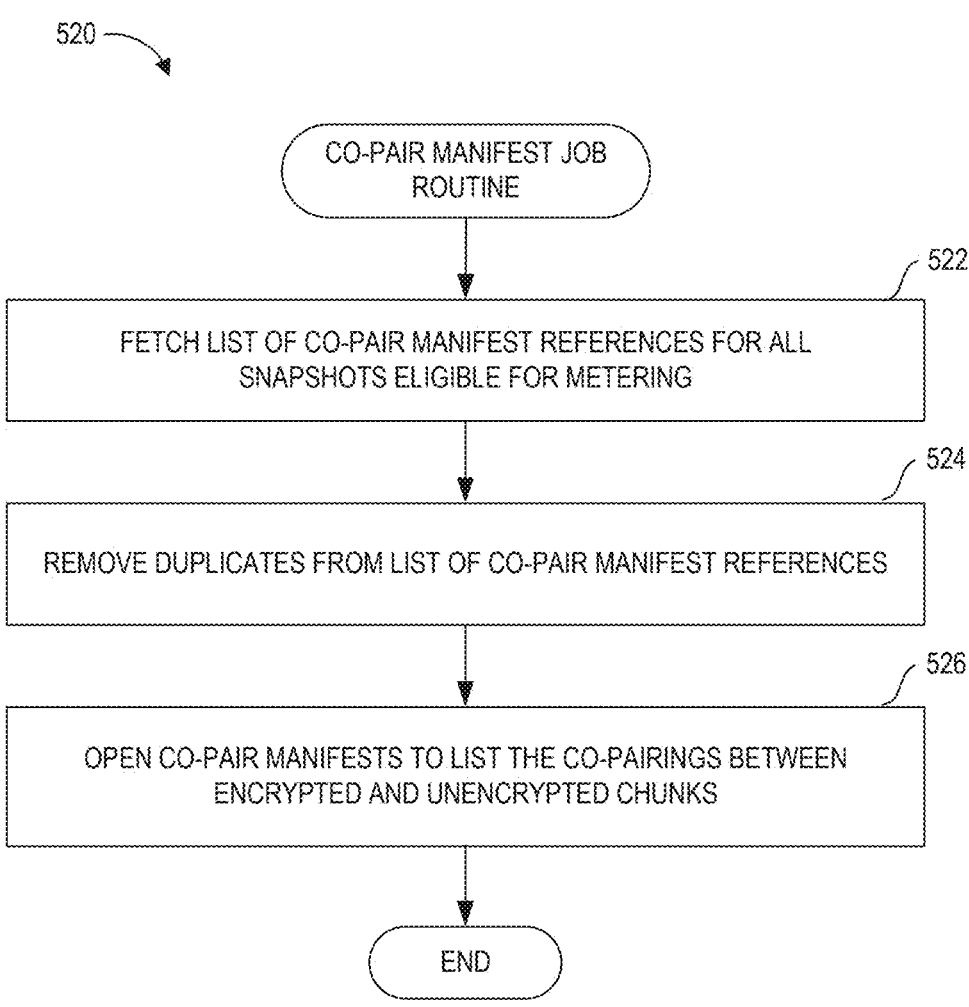
FIG. 5B depicts an illustrative sub-routine within FIG. 5A in which a metering system runs a job to use co-pair manifests to identify and deduplicate data in accordance with aspects of the present disclosure.

In FIG. 5B, sub-routine 520 describes an exemplary co-pair manifest job as referenced within FIG. 5A. The co-pair manifest job is a web service job that may be run by the metering system 220. This job uses co-pair manifests generated by the co-pair manifest generator 212 of the data equivalency system 210 to identify and deduplicate snapshot data from relevant main manifests. Throughout the discussion that follows, any reference to a "job" may be understood as any web service job used to process vast amounts of data such as Apache Hadoop or Amazon Web Services, in some examples.

The co-pair manifest job of sub-routine 520 begins at block 522, in which the metering system 220 fetches a list of co-pair manifest references for all snapshots eligible for metering (i.e., the eligible snapshots of block 502 in routine 500). Illustratively, such a list of references could be references to co-pair manifests such as Co-Pair Manifests 345 and 347 from FIG. 3B (assuming Snapshot S1 311 and Snapshot S2 312 are considered eligible snapshots for purposes of this example). At block 524, the metering system 220 removes duplicates from among the lists of co-pair manifest references. In this way, any co-pair manifest being referenced more than one time is reduced to a single reference, as its equivalencies only need to be utilized once during this job, and no additional benefit comes from duplicate references to the same co-pair manifest. Block 524 also reduces the amount of data being handled by the metering system 220. At block 526, once duplicate references to co-pair manifests are removed, the metering system 220 opens each co-pair manifest referenced in the list from block 524 and proceeds to list the co-pairings between encrypted and unencrypted chunks of eligible snapshots representing resource usage for this particular job. This list of co-pairings from block 526 is later used as input for sub-routine 540 (described in FIG. 5D). As such, the co-pair manifest job of sub-routine 520 concludes.

Figure 5C:
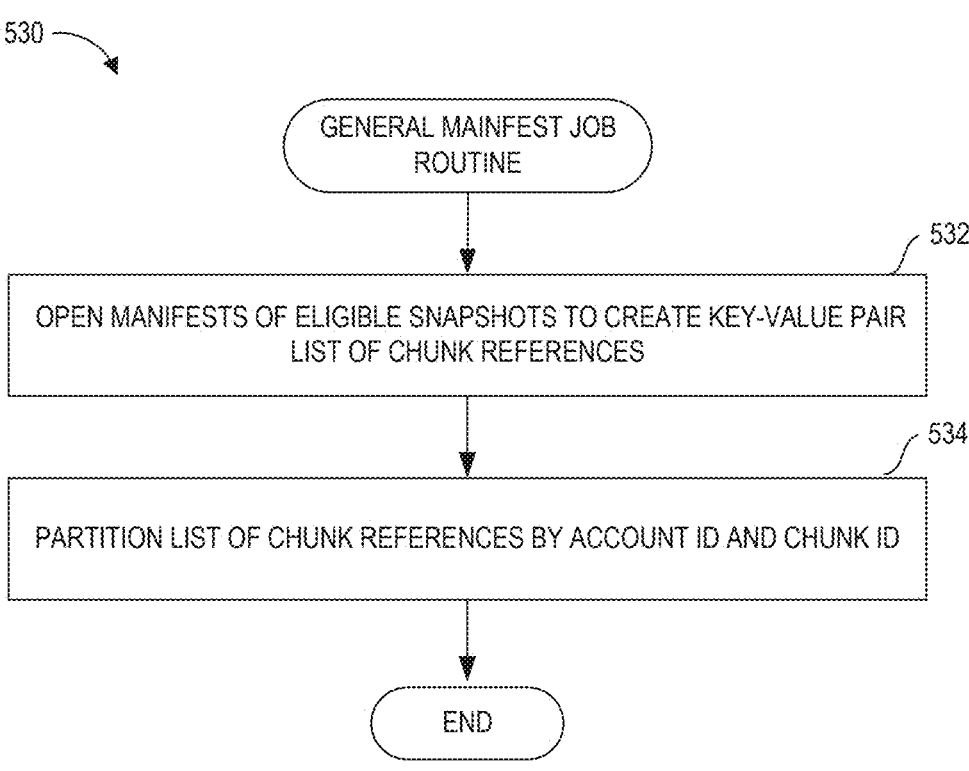
FIG. 5C depicts an illustrative sub-routine within FIG. 5A in which a metering system runs a job to open manifests and partition chunk references in accordance with aspects of the present disclosure.

Turning now to FIG. 5C, sub-routine 530 represents an exemplary general manifest job previously referenced in block 504 of routine 500 in FIG. 5A. The general manifest job is a web service job run by the metering system 220 to open main manifests and partition chunk references. This general manifest job is run concurrently with the previously discussed co-pair manifest job in sub-routine 520. Beginning at block 532, the general manifest job begins with the metering system 220 opening main manifests of eligible snapshots (e.g., the eligible snapshots of block 502 in FIG. 5A) to create a list of key-value pairs called "chunk references." Such chunk references may contain data such as the chunk identifier ("chunk ID"), snapshot identifier ("snapshot ID"), and account identifier ("account ID"), as well as the chunk size and other time fields. Each identifier represents a unique ID for the given data point. For example, an account ID may uniquely represent a user account (e.g., account 370) and a snapshot ID may represent the ID of a snapshot for a given object. At block 532, the metering system 220 may also open up other types of manifests such as a differential manifest, to obtain the aforementioned data for the chunk reference list. At block 534, the metering system 220 partitions the chunk reference list from block 532 by account ID and chunk ID. At the conclusion of sub-routine 530, the general manifest job is complete and its partitioned chunk reference list is used as input for sub-routine 540 (described in FIG. 5D).

Stepping back out to the discussion of routine 500 in FIG. 5A, now that both jobs of block 504 (the co-pair manifest job and the general manifest job) have been concurrently run and concluded, the routine 500 for resource usage metering continues at block 506. At block 506, the metering system 220 runs another web service job to generate byte-hour usage of each chunk in an account. Keeping with the structure of the above discussion, this job is described in detail in sub-routine 540 of FIG. 5D.

Figure 5D:
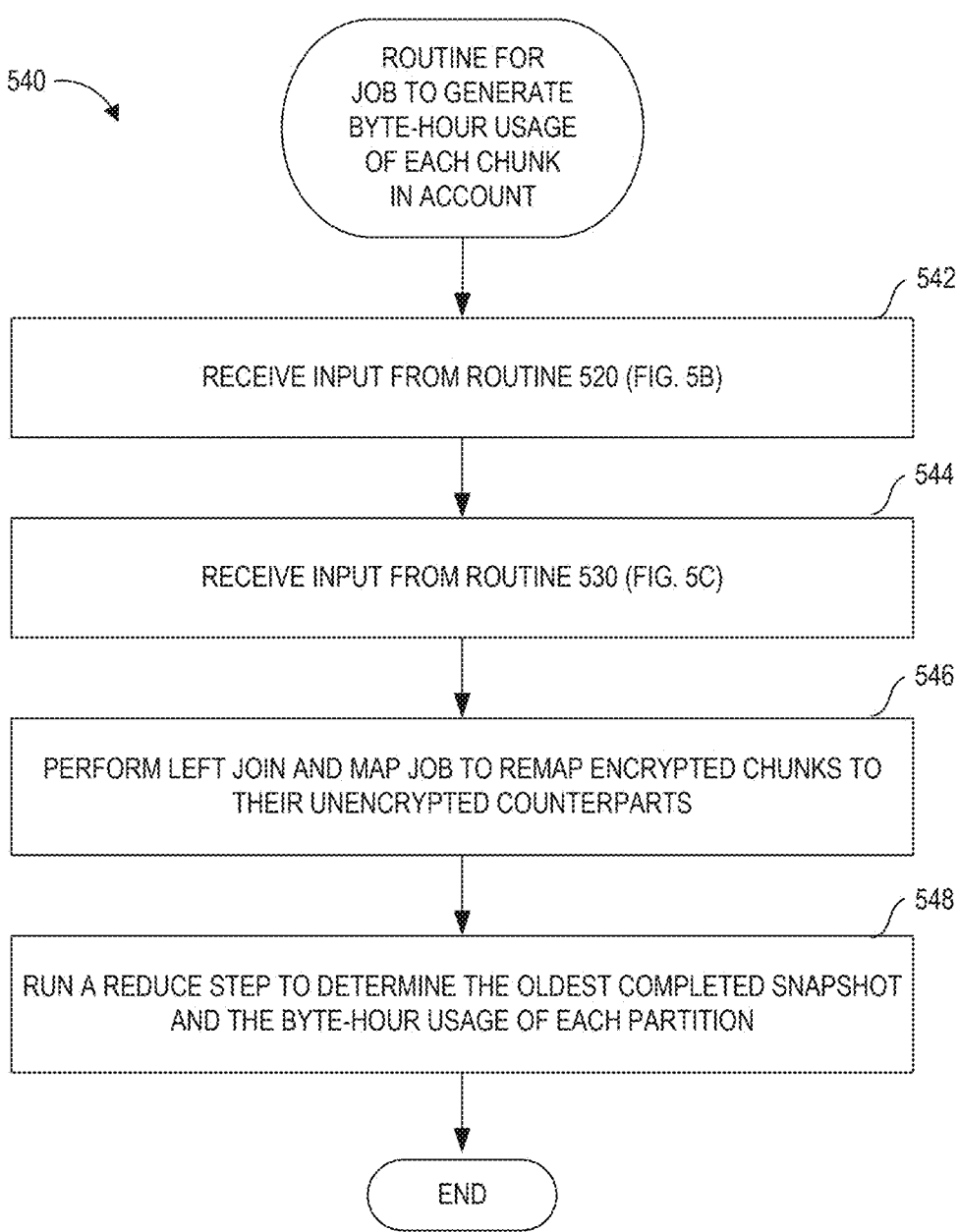
FIG. 5D depicts an illustrative sub-routine within FIG. 5A in which a metering system runs a job to generate deduplicated byte-hour usage of each chunk in an account in accordance with aspects of the present disclosure.

Thus, turning now to FIG. 5D, illustrative sub-routine 540 (within routine 500 of FIG. 5A) depicts a job run by a metering system 220 to generate byte-hour usage of each chunk in an account. Beginning at block 542, the metering system 220 receives input from sub-routine 520 of FIG. 5B, namely, the list of co-pairings between encrypted and unencrypted chunks of eligible snapshots representing resource usage created at block 526. Next at block 544 of sub-routine 540, the metering system 220 similarly receives input from sub-routine 530 of FIG. 5C, namely, the partitioned chunk reference list of block 536. Notably, the ordering of blocks 542 and blocks 544 are interchangeable (or may be concurrent).

Next at block 546, using the list of co-pairings and the partitioned chunk reference list, the metering system performs a left join and a map job to remap encrypted chunks to their unencrypted counterparts. In this way, the co-pair manifests reflected in the list of co-pairings is leveraged to replace the chunk IDs for encrypted chunks with the chunk IDs for their corresponding unencrypted chunks. Then at block 548, the metering system 220 runs a reduce step (e.g., MapReduce) on the data resulting from block 546 to determine the oldest completed snapshot (e.g., the source snapshot representing the most senior node in the familial line of a given snapshot) corresponding to each chunk in an account and the byte hour usage of each partition. This process effectively deduplicates any unwanted redundancy brought about by the implementation of a data transformation such as the implementation of transparent encryption to block storage volumes 106. Through this deduplication of the chunk IDs and the reduce step, the metering system 220 utilizes the data equivalencies found in the co-pair manifests to refrain from double-counting resource usage due to encryption when metering. Sub-routine 540 concludes having computed the byte-hour usage of each chunk within the eligible snapshots used by a user account (e.g., account 370 of FIG. 3A). This usage data will be used for metering by the metering system 220.

Returning once again to the discussion of routine 500 in FIG. 5A, now that block 506 has generated the byte-hour usage of each chunk in an account, the routine 500 for resource usage metering continues at block 508. At block 508, the metering system 220 runs a final web service job to generate byte-hour usage of each snapshot in an account. Keeping with the structure of the above discussion, this job is described in detail in sub-routine 550 of FIG. 5E.

Figure 5E:
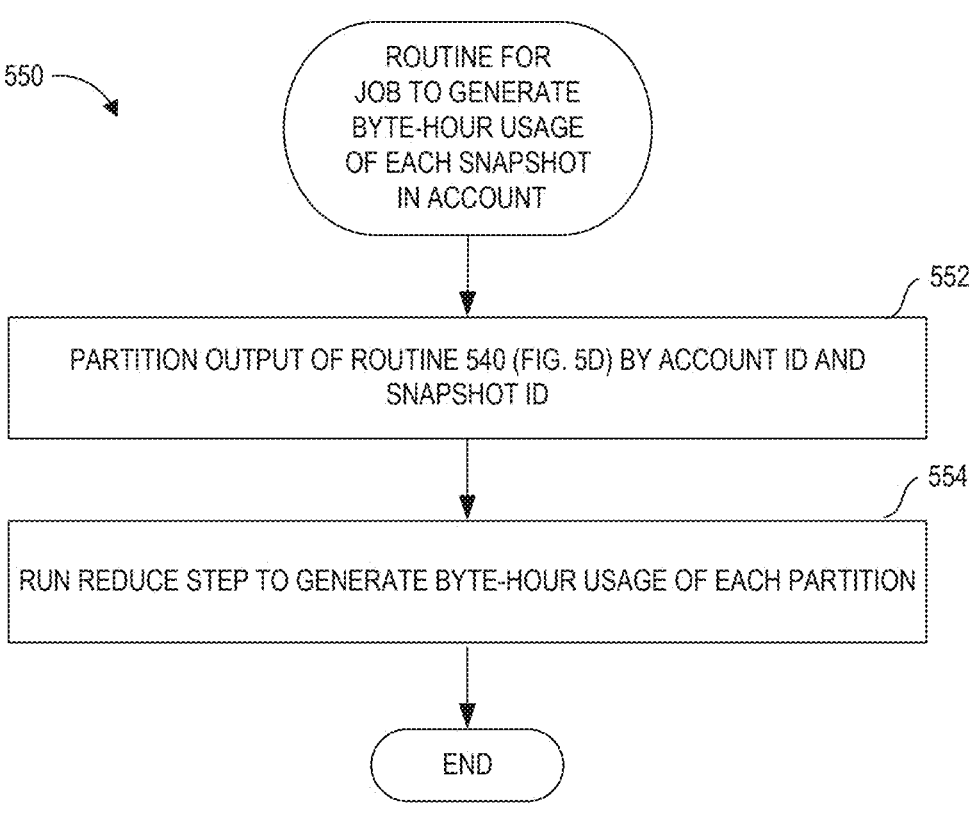
FIG. 5E depicts an illustrative sub-routine within FIG. 5A in which a metering system runs a job to generate deduplicated byte-hour usage of each snapshot in an account in accordance with aspects of the present disclosure.

FIG. 5E depicts an illustrative sub-routine 550 (within routine 500 of FIG. 5A) in which the metering system 220 runs a job to generate byte-hour usage of each snapshot in an account. Beginning at block 552, this job further partitions the output of sub-routine 540 (e.g., the byte-hour usage of each partition from block 548) by account ID and snapshot ID. Finally, at block 554, one last reduce step (e.g., MapReduce) is run by the metering system 220 to generate the byte-hour usage of each resulting partition from block 552. In this way, sub-routine 550 concludes having generated the byte-hour usage of each eligible snapshot in an account.

Returning one final time to the discussion of routine 500 in FIG. 5A, at block 510, routine 500 concludes by submitting both forms of usage obtained from blocks 506 and 508 respectively for use by calculations of the metering system 220. Specifically, at block 510, the data being submitted for use in metering calculations is the byte-hour usage of each chunk within the eligible snapshots used by a user account (generated by sub-routine 540 of FIG. 5D) and the byte-hour usage of each eligible snapshot used by a user account (generated by sub-routine 550 of FIG. 5E). In this way, routine 500 and each of its sub-routines come together to provide a solution that more accurately meters resource usage (i.e., avoids undesired double-counting due to encryption) by specifically incorporating co-pair manifests generated by a data equivalency system 210 in order to deduplicate any chunk references affected by a data transformation such as encryption before making a final calculation for resource usage.

Figure 6:
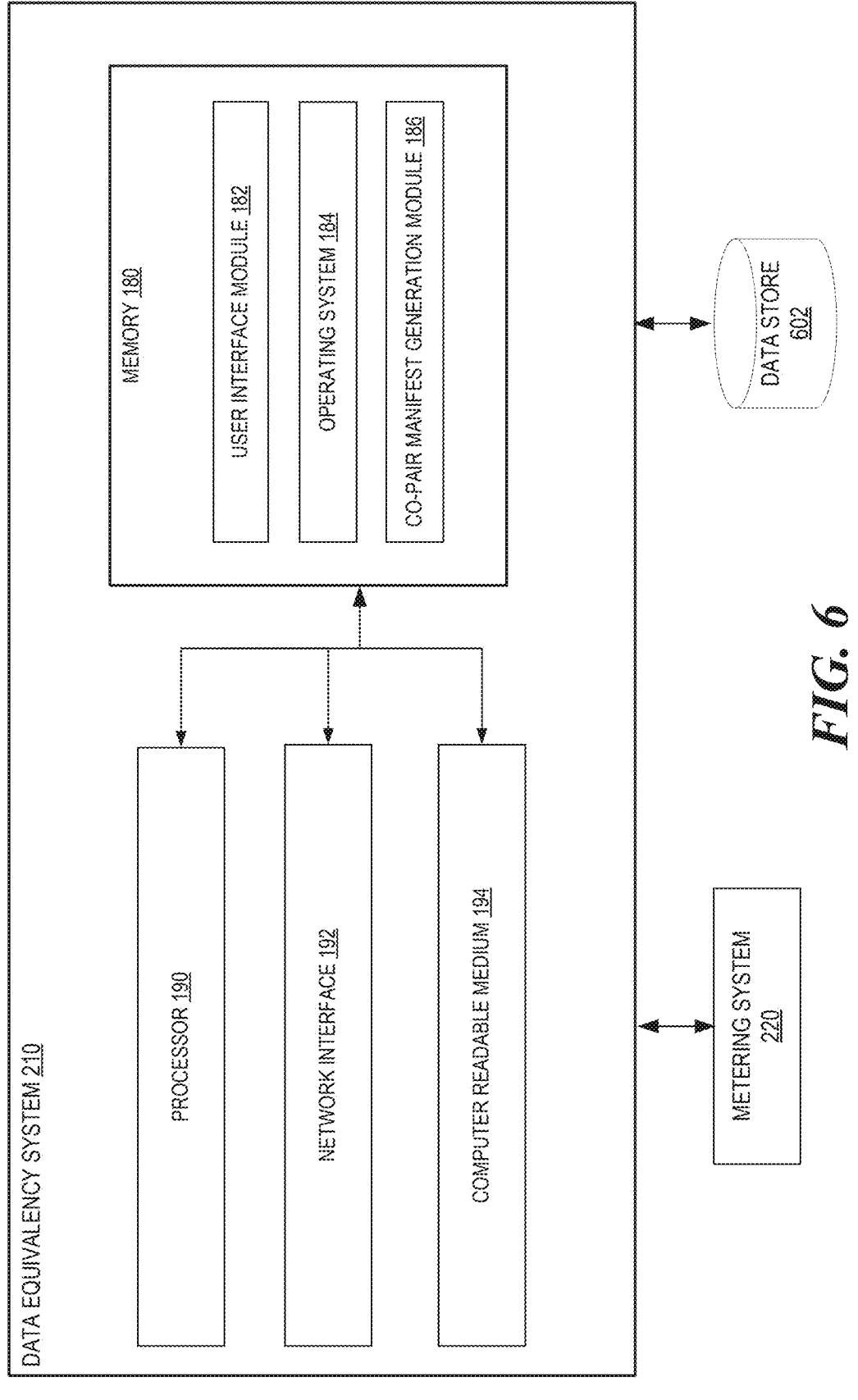
FIG. 6 depicts a general architecture of a computing device or system providing a data equivalency system in accordance with aspects of the present disclosure.

FIG. 6 depicts an example architecture of a computing system (referred to as the data equivalency system 210) that can be used to perform one or more of the techniques described herein or illustrated in FIGS. 1-5E. The general architecture of the data equivalency system 210 depicted in FIG. 6 includes an arrangement of computer hardware and software modules that may be used to implement one or more aspects of the present disclosure. The data equivalency system 210 may include many more (or fewer) elements than those shown in FIG. 6. It is not necessary, however, that all of these elements be shown in order to provide an enabling disclosure. As illustrated, the data equivalency system 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a co-pair manifest generation module 186 that may be executed by the processor 190. In one embodiment, the co-pair manifest generation module 186, when executed, implements various aspects of the present disclosure, e.g., creating co-pair mainfests to identify data equivalencies, submitting co-pair manifests to the metering system 220 for usage metering, and/or other aspects discussed herein or illustrated in FIGS. 1-5E.

In addition, the memory 180 may include or communicate with one or more data stores, such as the data store 602, which may be any persistent or substantially persistent data store (e.g., one or more hard disk drives, solid state drives, network accessible storage, a storage area network, or any number of data stores known in the art). The data store 602 may illustratively store equivalency data 214.

While the co-pair manifest generation module 186 are shown in FIG. 6 as part of the data equivalency system 210, in other embodiments, all or a portion of the co-pair manifest generation module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the data equivalency system 210. In some instances, the data equivalency system 210 may be implemented as one or more virtualized devices, such as one or more instances 116 on the compute servers 115. Moreover, as noted above, the data equivalency system 210 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for identifying data duplication in object-based snapshots of block-storage volumes, each object-based snapshot representing data of a corresponding block-storage volume at a point-in-time, the system comprising:
a metadata store storing metadata identifying individual object-based snapshots as encrypted or unencrypted, wherein an encrypted object-based snapshot corresponds to an encrypted block-storage volume, and sponds to an encrypted block-storage volume, and wherein an unencrypted object-based snapshot corresponds to an unencrypted block-storage volume;
an object data store including:
snapshot objects, each snapshot object representing one or more blocks of data;
main manifests, each main manifest corresponding to an object-based snapshot and including a full listing of snapshot objects within the object data store that collectively represent data of the corresponding block-storage volume at the point-in-time of the object-based snapshot; and
one or more co-pair manifests, each co-pair manifest corresponding to an object-based snapshot, and including a listing of encrypted snapshot objects with equivalencies to unencrypted snapshot objects, wherein the encrypted snapshot objects are distinct from the unencrypted snapshot objects and wherein an equivalency indicates that an encrypted snapshot object represents duplicate storage, in encrypted form, as block-storage volume source data stored in unencrypted form as an unencrypted snapshot object; and
one or more processors configured to:
generate a deduplicated listing of snapshot objects within the object data store by:
identifying a set of object-based snapshots for deduplication;
retrieving from the object data store a set of main manifests and a set of co-pair manifests corresponding to the set of object-based snapshots;
identifying data duplication in the set of main manifests based on listings of encrypted snapshot objects with equivalencies to unencrypted snapshot objects found in the set of co-pair manifests; and
removing identified data duplication in the set of main manifests.

2. The system of claim 1, wherein the deduplicated listing of snapshot objects provides accurate snapshot usage data for a usage metering service.

3. The system of claim 1, wherein a block-storage volume represents a virtual storage disk drive hosted by a block storage system distinct from the object data store.

4. The system of claim 1, wherein the one or more processors represent a distributed computing system collectively configured to generate the deduplicated listing of snapshot objects.

5. A computer-implemented method comprising:
generating a listing of equivalent snapshot objects that are referenced by one or more of a set of object-based snapshots, each object-based snapshot representing data of a corresponding block-storage volume at a point-in-time as a collection of snapshot objects that provide a copy of data of the block-storage volume at the point-in-time, wherein generating the listing comprises:
retrieving from an object data store a set of main manifests corresponding to the set of object-based snapshots, each main manifest including a full listing of snapshot objects within the object data store that collectively represent data of the corresponding block-storage volume at the point-in-time of the object-based snapshot;
retrieving from the object data store a set of co-pair manifests corresponding to the set of object-based snapshots, each co-pair manifest corresponding to an object-based snapshot, and including a listing of encrypted snapshot objects with equivalencies to unencrypted snapshot objects, wherein the encrypted snapshot objects are distinct from the unencrypted snapshot objects, and wherein an equivalency indicates that an encrypted snapshot object represents duplicate storage, in encrypted form, as block-storage volume source data stored in an unencrypted form as an unencrypted snapshot object;

identifying data duplication in the set of main manifests based on listings of encrypted snapshot objects with equivalencies to unencrypted snapshot objects found in the set of co-pair manifests; and removing identified data duplication in the set of main manifests.

6. The computer-implemented method of claim 5, wherein identifying data duplication in the set of main manifests based on listings of encrypted snapshot objects with equivalencies to unencrypted snapshot objects found in the set of co-pair manifests comprises implementing a MapReduce operation on a distributed computing system, the MapReduce operation including a reshuffling of information between devices of the distributed computing system during generation of the listing of equivalent snapshot objects that are referenced by one or more of a set of object-based snapshots.

7. The computer-implemented method of claim 5, further comprising identifying individual object-based snapshots as incremental or non-incremental, wherein an incremental object-based snapshot is associated with a parent object-based snapshot that represents an earlier state of the block-storage volume corresponding to the incremental object-based snapshot, and wherein a non-incremental object-based snapshot is not associated with a parent object-based snapshot.

8. The computer-implemented method of claim 7, wherein individual object-based snapshots can be inactive or active, and wherein identifying an individual object-based snapshot as incremental comprises identifying that the individual object-based snapshot is associated with an active parent object-based snapshot at a given point-in-time.

9. The computer-implemented method of claim 8, wherein identifying an individual object-based snapshot as non-incremental comprises inspecting metadata of the individual object-based snapshot, the metadata identifying a state of a parent of individual object-based snapshot as null.

10. The computer-implemented method of claim 9, wherein the metadata identifies an object-based snapshot as incremental or non-incremental by identifying whether the object-based snapshot depends on a prior object-based snapshot and identifying an active time period of the prior object-based snapshot.

11. The computer-implemented method of claim 9, wherein the metadata identifies each of the object-based snapshots as encrypted or unencrypted.

12. The computer-implemented method of claim 5, wherein the listing of equivalent snapshot objects that are referenced by one or more of a set of object-based snapshots is provided as input to a resource usage metering service.

13. The computer-implemented method of claim 5, wherein the set of main manifests and the set of co-pair manifests is stored on a network data store, and wherein retrieving the set of main manifests and the set of co-pair manifests comprises transferring the set of main manifests and the set of co-pair manifests over a network.

14. One or more non-transitory computer-readable media comprising instructions executable by one or more processors to generate a listing of equivalent snapshot objects that are referenced by one or more of a set of object-based snapshots, each object-based snapshot representing data of a corresponding block-storage volume at a point-in-time as a collection of snapshot objects that provide a copy of data of the block-storage volume at the point-in-time, wherein the instructions, when executed, cause the one or more processors to:

retrieve from an object data store a set of main manifests corresponding to the set of object-based snapshots, each main manifest including a full listing of snapshot objects within the object data store that collectively represent data of the corresponding block-storage volume at the point-in-time of the object-based snapshot;

retrieve from the object data store a set of co-pair manifests corresponding to the set of object-based snapshots, each co-pair manifest corresponding to an object-based snapshot, and including a listing of encrypted snapshot objects with equivalencies to unencrypted snapshot objects, wherein the encrypted snapshot objects are distinct from the unencrypted snapshot objects and wherein an equivalency indicates that an encrypted snapshot object represents duplicate storage, in encrypted form, as block-storage volume source data stored in unencrypted form as an unencrypted snapshot object;

identify data duplication in the set of main manifests based on listings of encrypted snapshot objects with equivalencies to unencrypted snapshot objects found in the set of co-pair manifests; and remove identified data duplication in the set of main manifests.

15. The one or more non-transitory computer-readable media of claim 14, wherein identifying data duplication in the set of main manifests based on listings of encrypted snapshot objects with equivalencies to unencrypted snapshot objects found in the set of co-pair manifests comprises implementing a MapReduce operation on a distributed computing system, the MapReduce operation including a reshuffling of information between devices of the distributed computing system during generation of the listing of equivalent snapshot objects that are referenced by one or more of a set of object-based snapshots.

16. The one or more non-transitory computer-readable media of claim 14, wherein the instructions, when executed, further cause the one or more processors to identify individual object-based snapshots as incremental or non-incremental, wherein an incremental object-based snapshot is associated with a parent object-based snapshot that represents an earlier state of the block-storage volume corresponding to the incremental object-based snapshot, and wherein a non-incremental object-based snapshot is not associated with a parent object-based snapshot.

17. The one or more non-transitory computer-readable media of claim 16, wherein individual object-based snapshots can be inactive or active, and wherein identifying an individual object-based snapshot as incremental comprises identifying that the individual object-based snapshot is associated with an active parent object-based snapshot at a given point-in-time.

18. The one or more non-transitory computer-readable media of claim 17, wherein identifying an individual object-based snapshot as non-incremental comprises inspecting metadata of the individual object-based snapshot, the metadata identifying a state of a parent of individual object-based snapshot as null.

19. The one or more non-transitory computer-readable media of claim 14, wherein the listing of equivalent snapshot objects that are referenced by one or more of a set of object-based snapshots is provided as input to a resource usage metering service.

20. The one or more non-transitory computer-readable media of claim 14, wherein the set of main manifests and the set of co-pair manifests is stored on a network data store, and wherein retrieving the set of main manifests and the set of co-pair manifests comprises transferring the set of main manifests and the set of co-pair manifests over a network.

* * * * *